ed States Patent (12) United States Patent
Sleeman et al.

(10) Patent No.: US 11,899,876 B2
(45) Date of Patent: Feb. 13, 2024

(54) MUTUAL CAPACITIVE TOUCH-SENSITIVE APPARATUS AND METHOD APPLYING INVERSE SIGNALS TO ELECTRODES

(71) Applicant: TouchNetix Limited, Fareham (GB)

(72) Inventors: Peter Timothy Sleeman, Fareham (GB); Stephen William Roberts, Fareham (GB)

(73) Assignee: TouchNetix Limited, Fareham (GB)

( * ) Notice: Subject to any disclaimer, the term of this patent is extended or adjusted under 35 U.S.C. 154(b) by 63 days.

(21) Appl. No.: 17/615,671

(22) PCT Filed: Jun. 8, 2020

(86) PCT No.: PCT/EP2020/065877
§ 371 (c)(1),
(2) Date: Dec. 1, 2021

(87) PCT Pub. No.: WO2020/249526
PCT Pub. Date: Dec. 17, 2020

(65) Prior Publication Data
US 2022/0229519 A1 Jul. 21, 2022

(30) Foreign Application Priority Data
Jun. 10, 2019 (GB) ...................................... 1908246

(51) Int. Cl.
*G06F 3/041* (2006.01)
*G06F 3/044* (2006.01)

(52) U.S. Cl.
CPC ........ *G06F 3/04166* (2019.05); *G06F 3/0416* (2013.01); *G06F 3/0446* (2019.05); *G06F 3/0445* (2019.05); *G06F 2203/04104* (2013.01)

(58) Field of Classification Search
CPC .. G06F 3/0446; G06F 3/0416; G06F 3/04166; G06F 3/0445; G06F 2203/04104
See application file for complete search history.

(56) References Cited

U.S. PATENT DOCUMENTS

| 9,678,598 B2 * | 6/2017 | Mamba ................. G06F 3/0418 |
| 2010/0073323 A1 * | 3/2010 | Geaghan ............... G06F 3/0446 |
| | | 345/174 |

(Continued)

FOREIGN PATENT DOCUMENTS

| KR | 101619081 B1 | 5/2016 |
| WO | 2019/118180 A1 | 6/2019 |

OTHER PUBLICATIONS

International Search Report and Written Opinion of the International Searching Authority for corresponding International Patent Application No. PCT/EP2020/065877, dated Aug. 19, 2020.

(Continued)

*Primary Examiner* — Darlene M Ritchie
(74) *Attorney, Agent, or Firm* — Renner, Otto, Boisselle & Sklar (57) ABSTRACT

A touch-sensitive apparatus includes drive electrodes, comprising at least first and second electrodes; a receiver electrode; drive circuitry configured to generate first and second time-varying voltage signals, wherein the time-varying voltage signals are the inverse of one another; and control circuitry that performs a first measurement on the receiver electrode during a first time period, wherein the control circuitry supplies at least one of the time-varying voltage signals to the drive electrodes during the first time period; and perform a second measurement on the at least one receiver electrode during a second time period, wherein the control circuitry is configured to supply at least one of the time-varying voltage signals to the drive electrodes during the second time period; and determine a resultant signal corresponding to the mutual capacitance between the first electrode and the receiver electrode based on both the first measurement and the second measurement.

14 Claims, 7 Drawing Sheets

(56) References Cited

U.S. PATENT DOCUMENTS

| | | | |
|---|---|---|---|
| 2013/0038570 A1* | 2/2013 | Seo | G06F 3/0445 |
| | | | 345/174 |
| 2013/0076675 A1 | 3/2013 | Shin et al. | |
| 2014/0043251 A1* | 2/2014 | Wilson | G06F 3/041 |
| | | | 345/173 |
| 2014/0292709 A1 | 10/2014 | Mizuhashi et al. | |
| 2015/0002460 A1 | 1/2015 | Lee | |
| 2017/0097728 A1* | 4/2017 | Hotelling | G06F 3/047 |
| 2017/0212619 A1* | 7/2017 | Sharma | G06F 3/0416 |
| 2022/0146892 A1* | 5/2022 | Kurasawa | G02F 1/13338 |

OTHER PUBLICATIONS

GB Combined Search and Examination Report issued for corresponding GB Application No. 1908246.0, dated Dec. 10, 2019.

* cited by examiner

MUTUAL CAPACITIVE TOUCH-SENSITIVE APPARATUS AND METHOD APPLYING INVERSE SIGNALS TO ELECTRODES

This application is a national phase of International Application No. PCT/EP2020/065877 filed Jun. 8, 2020, which claims priority to United Kingdom Application No. 1908246.0 filed Jun. 10, 2019, the entire disclosures of which are hereby incorporated by reference.

BACKGROUND OF THE INVENTION

The present invention relates to the field of touch sensors, for example touch sensors for overlying a display screen to provide a touch-sensitive display (touch screen). In particular, embodiments of the invention relate to techniques for measuring the mutual capacitance at a plurality of intersections between drive electrodes and receive electrodes for sensing the presence of one or more touching objects within a two-dimensional sensing area.

A capacitive touch sensor can be generalised as one that uses a physical sensor element comprising an arrangement of electrically conductive electrodes extending over a touch sensitive area (sensing area) to define sensor nodes (or intersection points) and controller circuitry connected to the electrodes and operable to measure changes in the electrical capacitance of each of the electrodes or the mutual-capacitance between combinations of the electrodes. The electrodes are typically provided on a substrate.

For capacitive touch sensors in which the mutual capacitance is measured between combinations of electrodes, to perform a complete scan of the mutual capacitance over the touch sensitive surface, each intersection (or combination) of electrodes must be individually measured. Touch sensors can be measured in accordance with at least two characteristics, namely the sensitivity of the touch sensor (i.e., how easily the touch sensor can detect a touch) and the responsiveness of the touch sensor (i.e., how quickly the touch sensor can detect/register a touch on the sensing surface from the moment a touch is present). In mutual capacitance measurement techniques, the sensitivity is broadly proportional to the time taken to measure the mutual capacitance at each intersection point between combinations of electrodes—generally, the greater the measurement time period, the better the sensitivity. Conversely, the responsiveness is broadly proportional to the time required to measure the mutual capacitance at all the intersection points of an electrode array—generally, the shorter the time, the better the responsiveness.

Most applications for touch sensors require both good sensitivity and good responsiveness, but as evident from above, a balance must be struck between the two parameters. One way to help improve the sensitivity and/or responsiveness is to employ faster electronics which can sample a signal (the mutual capacitance) at a higher sample rate. However, faster electronics are usually expensive and may be relatively large, and are thus are not practical for commercial applications.

There is therefore a desire to provide touch sensors which can offer an improvement in responsiveness and/or sensitivity in detecting touches.

SUMMARY OF THE INVENTION

According to a first aspect of the invention there is provided a touch-sensitive apparatus, the apparatus comprising: a plurality of drive electrodes, comprising at least a first electrode and a second electrode; at least one receiver electrode; drive circuitry configured to generate a first time-varying voltage signal and a second time-varying voltage signal, wherein the first and second time-varying voltage signals are the inverse of one another; and control circuitry configured to: perform a first measurement on the at least one receiver electrode during a first time period, wherein the control circuitry is configured to supply at least one of the first and second time-varying voltage signals to the first and second drive electrodes during the first time period; and perform a second measurement on the at least one receiver electrode during a second time period, wherein the control circuitry is configured to supply at least one of the first and second time-varying voltage signals to the first and second drive electrodes during the second time period; and determine a resultant signal corresponding to the mutual capacitance between the first electrode and the at least one receiver electrode based on both the first measurement and the second measurement.

In accordance with certain aspects the control circuitry is configured to determine a resultant signal corresponding to the mutual capacitance between the second electrode and the at least one receiver electrode based on both the first measurement and the second measurement.

In accordance with certain aspects in at least one of the first period and the second period, the control circuitry is configured to supply the first time-varying voltage signal to the first drive electrode or the second drive electrode and to supply the second time-varying voltage signal to the other of the first drive electrode or the second drive electrode.

In accordance with certain aspects the control circuitry is configured to, for the first time period, apply the first time-varying voltage signal to the first electrode and the second time-varying voltage signal to the second electrode and perform the first measurement on the at least one receiver electrode, and for the second time period, apply the first time-varying voltage signal to the second electrode and the second time-varying voltage signal to the first electrode, and perform a second measurement on the at least one receiver electrode.

In accordance with certain aspects the plurality of drive electrodes further includes third and fourth drive electrodes, and wherein the control circuitry is configured to: perform a first measurement on the at least one receiver electrode during a first time period, wherein the control circuitry is configured to supply the first time-varying voltage signal to the first drive electrode and the second time-varying voltage signal to the second, third and fourth drive electrodes during the first time period; perform a second measurement on the at least one receiver electrode during a second time period, wherein the control circuitry is configured to supply the first time-varying voltage signal to the second drive electrode and the second time-varying voltage signal to the first, third and fourth drive electrodes during the second time period; perform a third measurement on the at least one receiver electrode during a third time period, wherein the control circuitry is configured to supply the first time-varying voltage signal to the third drive electrode and the second time-varying voltage signal to the first, second and fourth drive electrodes during the third time period; perform a fourth measurement on the at least one receiver electrode during a fourth time period, wherein the control circuitry is configured to supply the first time-varying voltage signal to the fourth drive electrode and the second time-varying voltage signal to the first, second and third and drive electrodes during the second time period; determine the resultant signal corresponding to the mutual capacitance between the first electrode and the at least one receiver electrode based on the first measurement, the second measurement, the third measurement and the fourth measurement; determine a resultant signal corresponding to the mutual capacitance between the second electrode and the at least one receiver electrode based on the first measurement, the second measurement, the third measurement and the fourth measurement; determine a resultant signal corresponding to the mutual capacitance between the third electrode and the at least one receiver electrode based on the first measurement, the second measurement, the third measurement and the fourth measurement; and determine a resultant signal corresponding to the mutual capacitance between the fourth electrode and the at least one receiver electrode based on the first measurement, the second measurement, the third measurement and the fourth measurement.

In accordance with certain aspects the control circuitry is configured to determine the resultant signal corresponding to the mutual capacitance between the first electrode and the at least one receiver electrode by subtracting the second, third and fourth measurements from the first measurement; determine the resultant signal corresponding to the mutual capacitance between the second electrode and the at least one receiver electrode by subtracting the first, third and fourth measurements from the second measurement; determine the resultant signal corresponding to the mutual capacitance between the third electrode and the at least one receiver electrode by subtracting the first, second and fourth measurements from the third measurement; and determine the resultant signal corresponding to the mutual capacitance between the fourth electrode and the at least one receiver electrode by subtracting the first, second and third measurements from the fourth measurement.

In accordance with certain aspects the control circuitry is configured to determine the presence of a touch at an intersection between the first drive electrode and the at least one receiver electrode by comparing the difference between the resultant signal corresponding to the mutual capacitance between the first electrode and the at least one receiver electrode and a signal corresponding to the mutual capacitance between the first electrode and the at least one receiver electrode obtained in the absence of a touch to a predetermined threshold.

In accordance with certain aspects the plurality of drive electrodes is divided into groups of drive electrodes consisting of N drive electrodes, where N is an even number, and wherein the control circuitry is configured, for each group of drive electrodes, perform N measurements, including the first and second measurements, over N time periods, wherein for each time period the control circuitry applies at least one of the first time-varying voltage signal and the second time-varying voltage signal to the drive electrodes.

In accordance with certain aspects, for each N time period, the control circuitry is configured to apply a different combination of the first time-varying signal and the second time varying signal to the N drive electrodes.

In accordance with certain aspects the control circuitry is configured to determine the resultant signal corresponding to the mutual capacitance at each intersection between the N drive electrodes and the at least one receive electrode.

In accordance with certain aspects when the plurality of electrodes divided by N is not equal to an integer, the control circuitry is configured to include at least one drive electrode in two groups.

According to a second aspect of the invention there is provided a system comprising the touch-sensitive apparatus of any preceding aspect, further comprising system processing circuitry communicatively coupled to the processing circuitry of the touch-sensitive apparatus.

In accordance with certain aspects the system processing circuitry is configured to cause the system to perform a first action in response to receiving a signal output from the processing circuitry of the touch-sensitive apparatus indicating the presence of a touch on the touch-sensitive element.

According to a third aspect of the invention there is provided method for determining the presence of a touch on a touch-sensitive element of a touch-sensitive apparatus, the apparatus comprising a plurality of drive electrodes, comprising at least a first electrode and a second electrode, and at least one receiver electrode, wherein the method comprises: generating a first time-varying voltage signal and a second time-varying voltage signal, wherein the first and second time-varying voltage signals are the inverse of one another; performing a first measurement on the at least one receiver electrode during a first time period, wherein at least one of the first and second time-varying voltage signals is supplied to the first and second drive electrodes during the first time period; perform a second measurement on the at least one receiver electrode during a second time period, wherein at least one of the first and second time-varying voltage signals is supplied to the first and second drive electrodes during the second time period; and determine a resultant signal corresponding to the mutual capacitance between the first electrode and the at least one receiver electrode based on both the first measurement and the second measurement.

In accordance with certain aspects in at least one of the first period and the second period, the first time-varying voltage signal is supplied to the first drive electrode or the second drive electrode and the second time-varying voltage signal is supplied to the other of the first drive electrode or the second drive electrode.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

Broadly speaking, the present invention relates to a mutual capacitance type touch sensitive apparatus which uses a mutual capacitance measurement technique to measure (directly or indirectly) the mutual capacitances at intersections between transmit electrodes and receive electrodes of an electrode array forming a touch sensitive element. More specifically, the present invention applies combinations of a first time-varying voltage signal and a second time-varying voltage signal (which are the inverse of one another) at any one time to the drive electrodes of the electrode array (or a sub-set thereof) and measures the resulting signal at the receive electrode. By applying different combinations of the first and second voltage signals to the electrodes at different time periods, and making measurements of the resultant signals, the touch sensitive apparatus can obtain data relating to the mutual capacitance at each of the intersection points simultaneously. That is, because each measurement is made when a drive signal is applied to each of the drive electrodes, each measurement contains data on the mutual capacitance at any of the associated intersection points. By using signals which are the inverse of one another, processing circuitry is able to combine the plurality of measurements (which contain data on each of the intersection points of the group of drive electrodes) in such a way as to isolate the data for any one of the plurality of intersection points. Furthermore, because each of the plurality of measurements contains data on the mutual capacitance of each of the intersection points, either more data on the mutual capacitance at any given intersection point can be obtained in a similar time period as compared to conventional mutual capacitance measurement techniques, or the same amount of data can be obtained in a shorter time period. Accordingly, using the techniques of the present invention, the sensitivity and/or responsiveness of the touch sensitive apparatus can be improved.

Figure 1:
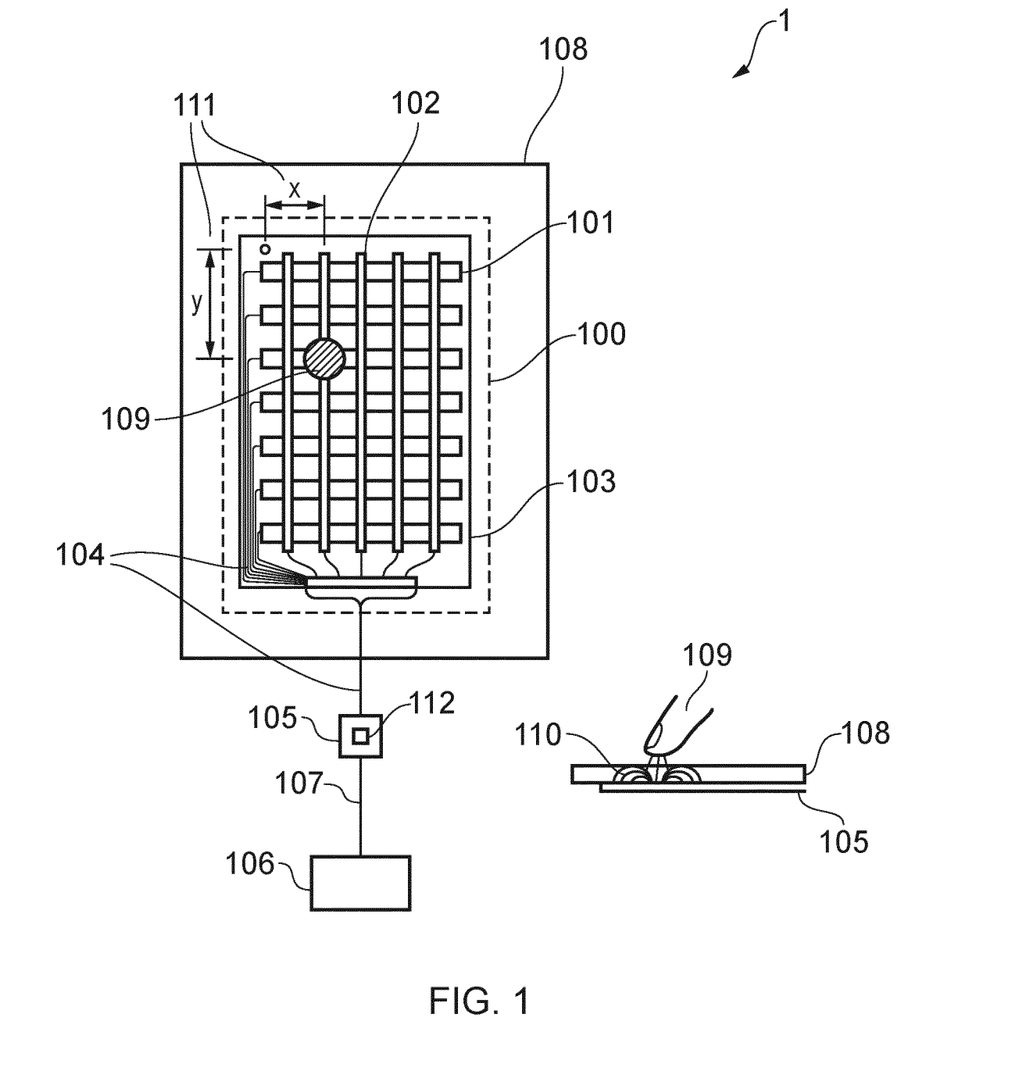
FIG. 1 schematically illustrates a touch sensitive apparatus in accordance with certain embodiments of the invention.

FIG. 1 schematically shows a touch-sensitive apparatus 1 in accordance with the principals of the present disclosure. The touch-sensitive apparatus 1 is represented in plan view (to the left in the figure) and also in cross-sectional view (to the right in the figure).

The touch-sensitive apparatus 1 comprises a sensor element 100, measurement circuitry 105, processing circuitry 106, and cover 108. The sensor element 100 and cover 108 may, more generally be referred to as a touch screen or touch-sensitive element of the touch-sensitive apparatus 1, while the measurement circuitry 105 and processing circuitry 106 may, more generally, be referred to as the controller of the touch-sensitive apparatus 1.

The touch screen is primarily configured for establishing the position of a touch within a two-dimensional sensing area by providing Cartesian coordinates along an X-direction (horizontal in the figure) and a Y-direction (vertical in the figure). In this implementation, the sensor element 100 is constructed from a substrate 103 that could be glass or plastic or some other insulating material and upon which is arranged an array of electrodes consisting of multiple laterally extending parallel electrodes, X-electrodes 101 (row electrodes), and multiple vertically extending parallel electrodes, Y-electrodes 102 (column electrodes), which in combination allow the position of a touch 109 to be determined. To clarify the terminology, and as will be seen from FIG. 1, the X-electrodes 101 (row electrodes) are aligned parallel to the X-direction and the Y-electrodes 102 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures. The X-electrodes 101 and Y-electrodes 102 define a sensing (or sense) area, which is a region of the substrate 103 which is sensitive to touch.

In some cases, each electrode may have a more detailed structure than the simple "bar" structures represented in FIG. 1, but the operating principles are broadly the same. The sensor electrodes are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4).

Referring back to FIG. 1, the electrodes 101, 102 are electrically connected via circuit conductors 104 to measurement circuitry 105, which is in turn connected to processing circuitry 106 by means of a circuit conductors 107. The measurement circuitry 105 and/or the processing circuitry 106 may each be provided by a (micro)controller, processor, ASIC or similar form of control chip. Although shown separately in FIG. 1, in some implementations, the measurement circuitry and the processing circuitry may be provided by the same (micro)controller, processor, ASIC or similar form of control chip. The measurement circuitry 105 and/or the processing circuitry 106 may be comprised of a printed circuit board (PCB), which may further include the various circuit conductors 104, 107. The measurement circuitry 105 and the processing circuitry 106 may be formed on the same PCB, or separate PCBs. Note also that the functionality provided by either of the measurement circuitry 105 and the processing circuitry 106 may be split across multiple circuit boards and/or across components which are not mounted to a PCB. The processing circuitry 106 interrogates the measurement circuitry 105 to recover the presence and coordinates of any touch or touches present on, or proximate to, the sensor element 100.

Generally speaking, the measurement circuitry 105 is configured to perform capacitance measurements associated with the electrodes 101, 102 (described in more detail below). The measurement circuitry 105 comprises drive circuitry 112 for generating electrical signals for performing the capacitance measurements. The measurement circuitry 105 outputs the capacitance measurements to the processing circuitry 106, which is arranged to perform processing using the capacitance measurements. The processing circuitry 106 may be configured to perform a number of functions, but at the very least is configured to determine when a touch 109, caused by an object such a human finger or a stylus coming into contact with (or being adjacent to) the sense area of the sensor element 100 with appropriate analysis of relative changes in the electrodes' measured capacitance/capacitive coupling. This determination process is described in more detail below. The processing circuitry 106, as in the described implementation, may also be configured to, with appropriate analysis of relative changes in the electrodes' measured capacitance/capacitive coupling, calculate a touch position on the cover's surface as an X-Y coordinate 111.

In the example, a front cover (also referred to as a lens or panel) 108 is positioned in front of the substrate 103 and a single touch 109 on the surface of the cover 108 is schematically represented. Note that the touch itself does not generally make direct galvanic connection to the sensor 103 or to the electrodes 102. Rather, the touch influences the electric fields 110 that the measurement circuitry 105 generates using the electrodes 102 (described in more detail below).

Figure 2:
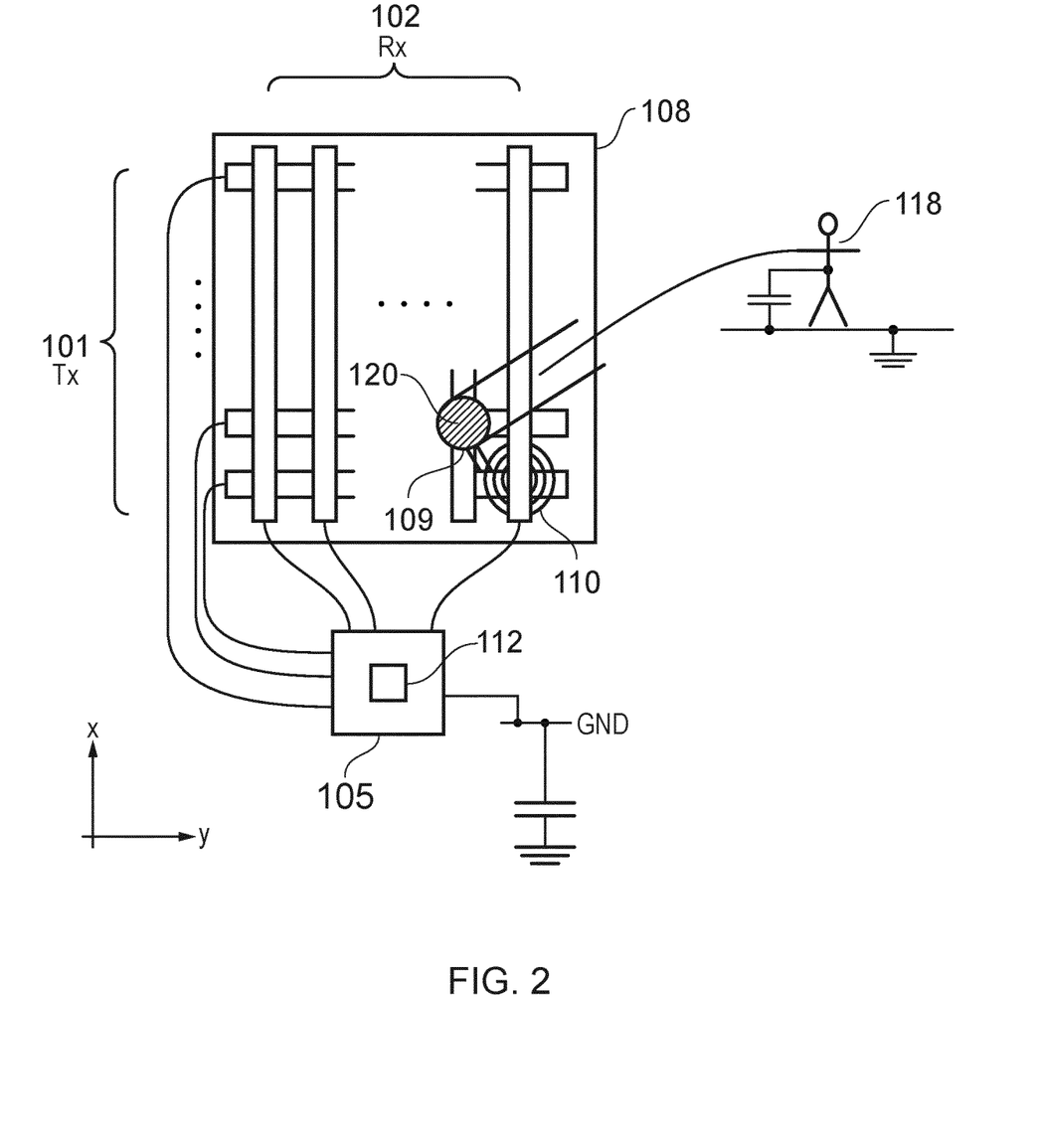
FIG. 2 schematically illustrates the mutual-capacitance type a touch sensitive apparatus of FIG. 1 in more detail, specifically with a view to explaining the principles of mutual capacitance measurement.

The measurement circuitry 105 of the described implementation is configured to measure the capacitance of the electrodes using a technique that is based on measuring what is frequently referred to as "mutual-capacitance". Reference is made to FIG. 2. In FIG. 2, the drive circuitry 112 of the measurement circuitry 105 is configured to generate and apply an electrical stimulus (drive signal) 113 to sequentially stimulate each of an array of transmitter (driven/drive) electrodes, shown as the X electrodes 101 in FIG. 2, that are coupled by virtue of their proximity to an array of receiver electrodes, shown as the Y electrodes 102 in FIG. 2. (It should be appreciated that the Y electrodes 102 may instead be the transmitting electrodes and the X electrodes 101 may instead be the receiving electrodes in other implementations). The resulting electric field 110 is now directly coupled from the transmitter to each of the nearby receiver electrodes. This is in contrast to systems which employ a technique that measure the "self-capacitance" of an electrode. The area local to and centred on the intersection of a transmitter and a receiver electrode is typically referred to as a "node" or "intersection point". Now, on application or approach of a conductive element such as a human finger, the electric field 110 is partly diverted to the touching object. That is, some of the field couples via the finger through the connected body 118, through free space and back to the measurement circuitry 105. An extra return path to the measurement circuitry 105 is hence established via the body 118 and "free-space". However, because this extra return path acts to couple the diverted field directly to the measurement circuitry 105, the amount of field coupled to the nearby receiver electrode 102 decreases. This is measured by the measurement circuitry 105 as a decrease in the "mutual-capacitance" between that particular transmitter electrode and receiver electrodes in the vicinity of the touch 109. The measurement circuitry 105 senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross, or intersect, within the sensing area of the sensor element 100. The magnitude of a capacitance change is nominally proportional to the area 120 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

Figure 3:
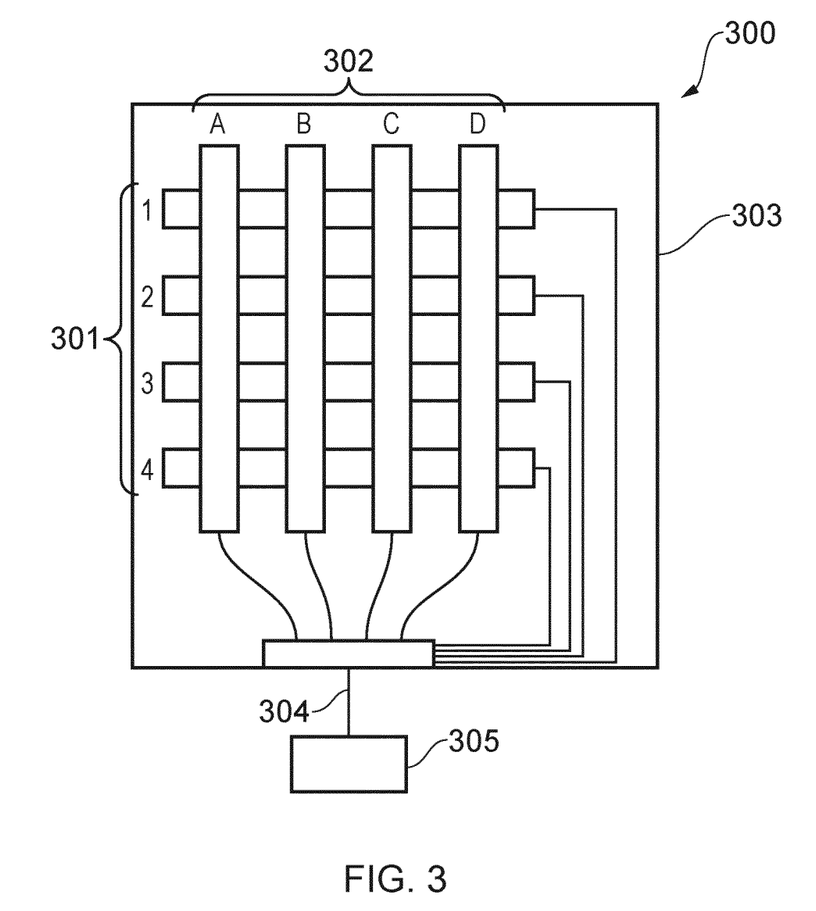
FIG. 3 schematically illustrates a conventional mutual-capacitance type touchscreen apparatus for explaining the measurement steps associated with a conventional mutual-capacitance type touchscreen.

In the described implementation, the electrodes 101, 102 are arranged on an orthogonal grid, with a first set of electrodes (e.g., the transmitter electrodes 101) on one side of a substantially insulating substrate 103 and the other set of electrodes (e.g., the receive electrodes 102) on the opposite side of the substrate 103 and oriented at substantially 90° to the first set. This is as schematically shown in FIG. 3. In other implementations, the electrodes may be oriented at a different angle (e.g., 30°) relative to one another. In addition, it should also be appreciated that it is also possible to provide structures where the grid of electrodes is formed on a single side of the substrate 103 and small conductive bridges are used to allow the two orthogonal sets of electrodes to cross each other without short circuiting. However, these designs are more complex to manufacture and less suitable for transparent sensors. Regardless of the arrangement of the electrodes, broadly speaking, one set of electrodes is used to sense touch position in a first axis that we shall call "X" and the second set to sense the touch position in the second orthogonal axis that we shall call "Y".

The mutual capacitance measurement technique offers some advantages over other techniques, such as self-capacitance measurement techniques, in that mutual capacitance measurement techniques can identify mutual capacitance changes independently at each of the electrode intersection points. This means that the mutual capacitance technique lends itself to applications which require the detection of multiple touches as inputs to associated apparatuses (such as a PC or other computing device running a software application). However, the mutual capacitance technique is generally not as sensitive to touches as other techniques such as self-capacitance measurement techniques, partly due to the fact that sources of noise have a much more significant impact in the mutual capacitance measurement techniques. What this means is that it may be more difficult when using mutual capacitance measurement techniques to correctly identify a touch as genuine (i.e., resulting from a user touching the touch sensitive element) as opposed to a source of noise. In addition, in order to increase the sensitivity, a greater sample time is required for sampling the signal (i.e., the measured mutual capacitance). However, increasing the sample time to increase the ability of the touch sensor to sense a genuine touch (i.e., improve sensitivity) generally increases the response time of the system (i.e., how quickly the touch-sensitive apparatus responds (outputs an indication that a touch is detected) when a touch is first placed on the touch-sensitive present). A balancing of these two considerations is a part of what drives the design of mutual capacitance measurement based touch sensors.

FIG. 3 shows an example touch-sensitive apparatus 301 for the purposes of explaining the issues associated with a mutual capacitance measurement technique described above. The touch-sensitive apparatus 300 includes X-direction electrodes 301, Y-direction electrodes 302, an insulating substrate 303 on which the Y electrodes 302 are arranged on one side and the X-direction electrodes are arranged on the other side, connectors 304 which electrically connect the electrodes 301 and 302 to measurement circuitry 305. Other features which are not directly relevant to the example description are omitted for clarity. The electrodes 301, 302, substrate 303, and conductors 304 may be broadly similar to electrodes 101, 102, substrate 103 and conductors 104 described in conjunction with FIG. 1 above, and a specific description of these features is omitted here.

In order to aid explanation, each of the eight electrodes 301 and 302 shown is give an identifier. The four electrodes 301 (those that extend spatially in the X direction) are given the identifiers 1 to 4, while the four electrodes 302 (those that extend spatially in the Y direction) are given the identifiers A to D. The electrodes 301 and 302 in this implementation are orthogonal to one another and spatially intersect at various locations in the X-Y plane (although do not intersect in the Z axis), and these points are herein referred to as intersection points. The various intersection points are denoted according to combinations of the identifiers of the corresponding electrodes 301 and 302. For example, the intersection of electrode A and electrode 1 is denoted as intersection point A1, the intersection of electrode B and electrode 2 is denoted as intersection point B2, etc. It should be understood that each of the intersection points corresponds to a position in the X-Y plane of the touch-sensitive element. In other words, the intersection points can be translated into two-dimensional Cartesian coordinates on the surface of the touch-sensitive element.

In accordance with the mutual capacitance measurement technique, each of the drive electrodes 301 is driven, sequentially, with a drive signal. In other words, the measurement circuitry 305 applies a drive signal to electrode 1 for a first time period, then to electrode 2 for a second time period once the first time period has elapsed, then to electrode 3 for a third time period once the second time period has elapsed, and finally to electrode 4 for a fourth time period once the third time period has elapsed. The first, second, third and fourth time periods are of the same duration, T. When the measurement circuitry 305 is applying the drive signal to one of the electrodes 301, during that time period the measurement circuitry 305 sequentially couples each receive electrode 302 in turn such that the electric field generated by the transmit electrode is coupled to the measurement circuitry 305. At this time, the measurement circuitry 305 obtains a measurement indicative of the mutual capacitance at each intersection point. For example, when the electrode 1 is driven by the drive signal, the measurement circuitry sequentially couples electrode A for a fifth time period, then electrode B for a sixth time period, then electrode C for a seventh time period, and finally electrode D for an eighth time period. The fifth, sixth, seventh and eighth time periods are of the same duration and in this instance are T/4, such that the sum of the fifth, sixth, seventh and eighth time periods is equal to the time duration T. Accordingly, the measurement circuitry 305 obtains values indicative of the mutual capacitance at the intersection points A1, B1, C1, and D1. The measurement circuitry 305, after time T has elapsed, applies the drive signal to the next electrode of the transmit electrodes, i.e., electrode 2, and sequentially couples the receive electrodes A to D as described above to obtain values indicative of the mutual capacitance at intersection points A2, B2, C2, and D2. This is repeated for all drive electrodes.

If a touch is present at an intersection point, the then mutual capacitance differs from a steady state mutual capacitance, and this can be detected by any suitable processing circuitry (e.g., by comparing the difference between a steady state signal and a measured signal against a predefined threshold). In some practical systems, during the period T/4 when any of the mutual capacitances of the intersection points are being measured by measurement circuitry 305, measurement circuitry 305 is actually sampling the signal a plurality of times and determining an average value of the measurement for that time period. In cases where the time period is short, noise has more of an influence on the calculated mean value of the sampled signal, as compared to when the time period is longer. Therefore, effectively, the predetermined threshold can be set lower in instances where there is more confidence in the calculated mean value being an actual representation of the signal (in other words, when the signal to noise ratio is higher). In instances where there is less confidence in the calculated mean value being an actual representation of the signal (when the signal to noise ratio is lower), then the threshold is set relatively higher to avoid instances of noise being determined as touches. In other words, the sensitivity of the touch sensitive apparatus can be improved when the signal to noise ratio is relatively high. The signal to noise ratio generally varies as the square root of N, where N is the number of samples of the signal. Assuming that the sampling rate is fixed, then the signal to noise ratio effectively also varies as the square root of time, or using the terminology above, T/4.

Hence, while one can consider increasing T to improve signal to noise ratio (and thus sensitivity to a genuine touch), the overall time required to complete a scan of all intersection points also increases with T. In the example described, the overall time required to complete a scan is 4T. This means that the time between placing a finger or the like on the touch-sensitive element to the touch sensitive apparatus detecting the presence of the touch is around 4T. Hence, and as described above, increasing T leads to a detrimental effect on the responsiveness of the touch sensitive apparatus, and therefore a balance between sensitivity and responsiveness is required to be struck. In practical terms, using mutual capacitance in the conventional way, the value of T is limited by the achievable sample rate using the existing circuitry.

For the sake of completeness, it should be noted that the measurement circuitry 305 may use a multiplexer to selectively apply the drive signal to the transmit electrodes 301, and/or a multiplexer to selectively connect the receive electrodes 302 to the measurement circuitry 305. This allows a single drive circuitry and single receive circuitry to be used to make all the measurements, thus decreasing the overall costs of the circuitry. However, in other arrangements, each drive electrode may be coupled to its own drive circuitry which is selectively operated, and each receive electrode may be coupled to its own receive circuitry which is selectively operated. It should be appreciated that a combination of the two approaches may also be used, for example the drive electrodes may be coupled to a multiplexer and driven sequentially, while the receive electrodes are individually coupled to corresponding receive circuitry.

In accordance with the present disclosure, the inventors have identified a way to make more efficient use of the mutual capacitance measurement technique to improve the characteristics (i.e., sensitivity and/or responsiveness) of the touch-sensitive apparatus 1 for a given sample rate.

Figure 4:
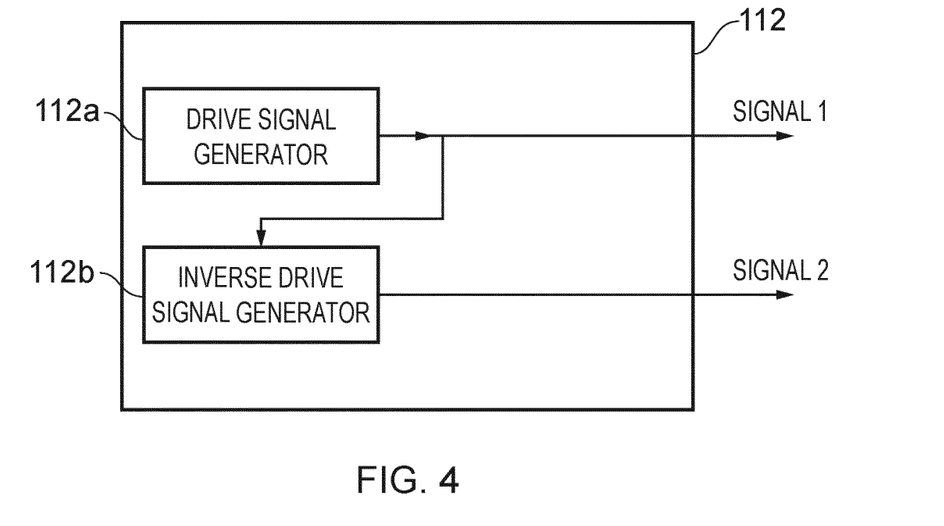
FIG. 4 schematically illustrates the drive circuitry of the touch sensitive apparatus of FIG. 1 in more detail in accordance with certain embodiments of the invention.

FIG. 4 is a highly schematic representation of the drive circuitry 112 of FIG. 1 in more detail. The drive circuitry 112 comprises a drive signal generator 112a and an inverse drive signal generator 112b. The drive signal generator 112a is configured to generate a first time-varying voltage signal, and more specifically a sine wave voltage signal. For convenience, this is referred to a signal 1. Signal 1 varies sinusoidally in accordance with a certain frequency, $\omega$, and having a certain amplitude, A. In other words, signal 1 may be represented mathematically as:

$$\text{signal } 1 = +A \sin(\omega t) \quad (1)$$

As shown in FIG. 4, signal 1 is input into inverse drive signal generator 112b. The inverse drive signal generator 112b is configured to invert signal 1 to produce a second signal, signal 2. In this instance, signal 2 is the inverse of signal 1. That is, signal 2 is a time-varying sine wave voltage signal which varies sinusoidally in accordance with the frequency, w, and has an amplitude, A, but is 180° out of phase with signal 1. In other words, when signal 1 is positive, signal 2 is negative by an equal but opposite amount. Signal 2 may be represented mathematically as:

$$\text{signal } 2 = -A \sin(\omega t) \quad (2)$$

The inverse drive signal generator 112b may be implemented using any suitable circuitry capable of inverting an input signal. Additionally, while the present implementation shows the inverse drive signal generator 112b receiving signal 1, in other implementations the inverse drive signal generator 112b may comprise similar circuitry to drive signal generator 112a but is controlled to generate an inverse signal to signal 1.

In accordance with the described implementation of FIG. 1, the measurement circuitry 105, which comprises drive circuitry 112, outputs signal 1 and signal 2 to the drive electrodes 101. More specifically, the measurement circuitry 105 is configured to output signal 1 to a first one of the driven electrodes 101 and at the same time output signal 2 to at least a second one of the driven electrodes 101, and then after a certain time period, output signal 2 to at least the first one of the driven electrodes 101 and at the same time output signal 1 to the second one of the driven electrodes 101, and so on.

FIGS. 5a to 5d exemplify these scenarios schematically using representations of the electrodes 101 and 102 of FIG. 1. Other features of FIG. 1 are omitted for reasons of clarity. More specifically, FIGS. 5a to 5d illustrate four driven electrodes 101 and a single receive electrode 102. For facilitating explanation, each of the driven electrodes has an identifier 1 to 4 (similar to as described in relation to FIG. 3).

Figure 5A:
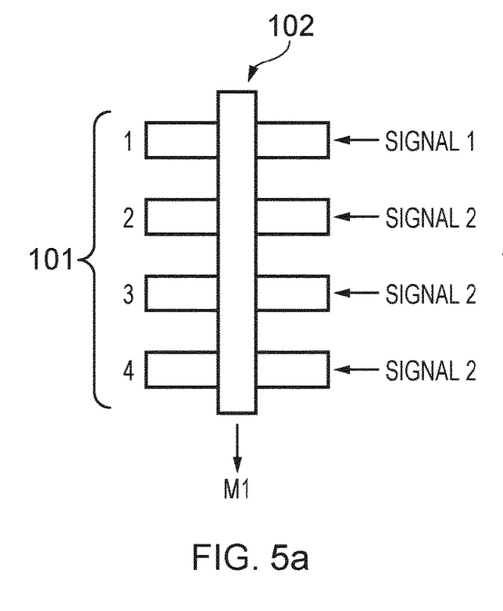
FIGS. 5a to 5d schematically illustrates a part of an electrode array of a touch sensitive apparatus for explaining the measurement techniques in accordance with certain embodiments of the invention.

Thus, in accordance with the principles of the disclosure, the measurement circuitry is configured to apply signal 1 and signal 2 to a group of four transmit electrodes 101. Initially, the measurement circuitry 105 applies signal 1 to a first transmit electrode (electrode 1) and signal 2 to the second to fourth electrodes (electrodes 2 to 4), as shown in FIG. 5a. The signals 1 and 2 are applied for a certain time period, e.g., T/4, and during this time, the measurement circuitry 105 makes a measurement M1 using receive electrode 102. The measurement M1 is effectively a summation of each of the signals received from the intersection points of the four electrodes with the receive electrode.

Figure 5B:
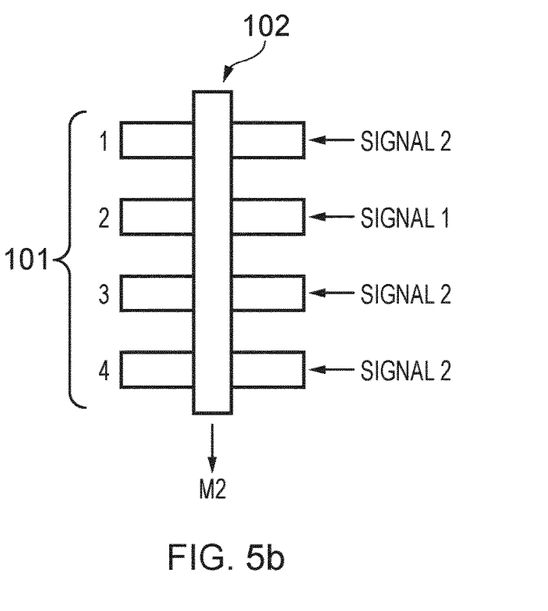
Figure 5C:
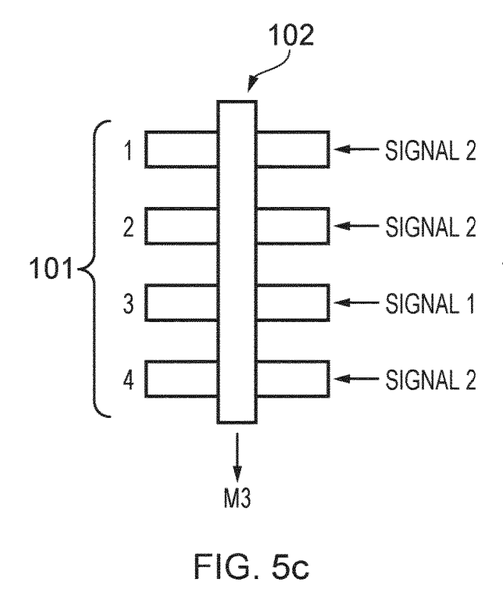
Figure 5D:
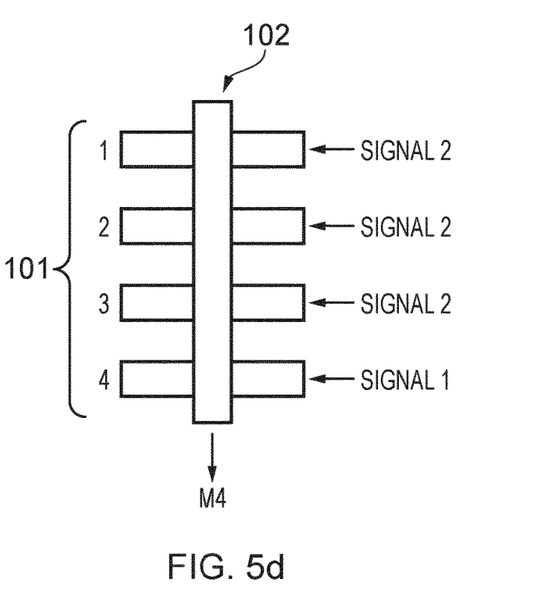

After the time T/4 has elapsed, the measurement circuitry 105 is then configured to apply signal 1 to the second transmit electrode (electrode 2) and signal 2 to the first, third and fourth electrodes (electrodes 1, 2, and 3), as shown in FIG. 5b. The signals 1 and 2 are again applied for a certain time period, e.g., T/4, and during this time, the measurement circuitry 105 makes a measurement M2 using receive electrode 102. As above, in the absence of a touch, M2 is effectively a summation of the signals from the four intersection points. The process is repeated where signal 1 is applied to electrode 3 and then electrode 4, while signal 2 is applied to the remaining electrodes, and measurements M3 and M4 are made using receive electrode, as shown in FIGS. 5c and 5d respectively.

The measurement circuitry 105 outputs measurements M1 to M4 to the processing circuitry 106. The processing circuitry 106 is configured to determine the mutual capacitance for each of the intersection points between electrodes 1 to 4 and receiver electrode 102. In particular, for the receiver electrode 102, processing circuitry 106 is configured to determine the mutual capacitances for the intersection points for electrodes 1 to 4 with receiver electrode 102 using the following equations:

$$E_{102\text{-}1} = M1 - M2 - M3 - M4 \quad (3)$$

$$E_{102\text{-}2} = M2 - M1 - M3 - M4 \quad (4)$$

$$E_{102\text{-}3} = M3 - M1 - M2 - M4 \quad (5)$$

$$E_{102\text{-}4} = M4 - M1 - M2 - M3 \quad (6)$$

where $E_{102\text{-}n}$ is the mutual capacitance for the intersection point between electrode 102 and electrode n of the drive electrodes 101.

When a drive signal is applied to a transmit electrode, as mentioned previously, an electric field is generated which couples to the receive electrode. The magnitude of the receive signal (i.e., the signal on the receive electrode) is proportional to the magnitude of the drive signal (i.e., the signal applied to the drive electrode). The magnitude of the drive signal |A|, and hence the magnitude of the receive signal can be represented by |B|. Each measurement M1 to M4 is effectively a summation of the corresponding coupled drive signal as detected by the receiving electrode. Assuming that both signal 1 and signal 2 when applied to a given transmit electrode couple to the receive electrode in the same way, then measurements M1 to M4 can be mathematically represented as:

$$M1 = +B1\sin(\omega t) + -B2\sin(\omega t) + -B3\sin(\omega t) + -B4\sin(\omega t) \quad (7)$$

$$M2 = -B1\sin(\omega t) + +B2\sin(\omega t) + -B3\sin(\omega t) + -B4\sin(\omega t) \quad (8)$$

$$M3 = -B1\sin(\omega t) + -B2\sin(\omega t) + +B3\sin(\omega t) + -B4\sin(\omega t) \quad (9)$$

$$M4 = -B1\sin(\omega t) + -B2\sin(\omega t) + -B3\sin(\omega t) + +B4\sin(\omega t) \quad (10)$$

where Bn signifies the amplitude of the coupled signal as received at the receive electrode 102 from drive electrode n.

In the absence of a touch, and assuming that the coupling between each transmit electrode and receive electrode is the same (that is, electrode 1 couples signals 1 and 2 to the receive electrode by the same amount as electrode 2 couples signals 1 and 2, etc.), then B1, B2, B3, and B4 are all equal (for convenience we shall refer to this as B), and effectively each measurement M1, M2, M3 and M4 is equal to −2Bsin (ωt). Accordingly, under these assumptions, using equations (3) to (6), the signal indicative of the mutual capacitance at each of the intersection points $E_{102\text{-}1}$, $E_{102\text{-}2}$, $E_{102\text{-}3}$, and $E_{102\text{-}4}$, is equal to 4Bsin(ωt). This is a value indicative of the mutual capacitance at the intersection point between the receive electrode 102 and each of the transmit electrodes 1 to 4, and in the absence of any touch, may be referred to as indicative of the steady state of the mutual capacitance at the respective intersection point.

When a touch is present on the electrodes, say at the intersection point between electrode 1 and the receive electrode 102, then the coupling of the drive signal 1 or 2 to the receive electrode is changed (and in particular lowered). In other words, B1 is no longer equal to B. Using equations (3) to (6), and assuming that B2, B3, and B4 are all equal to B in equations (7) to (10), then the values for the intersection points read as:

$$E_{102\text{-}1} = 4B1\sin(\omega t) \quad (11)$$

$$E_{102\text{-}2} = 4B\sin(\omega t) \quad (12)$$

$$E_{102\text{-}3} = 4B\sin(\omega t) \quad (13)$$

$$E_{102\text{-}4} = 4B\sin(\omega t) \quad (14)$$

Hence, according to the present disclosure, the processing circuitry 106 is configured to combine the measurements M1 to M4 to arrive at measurements indicative of the mutual capacitances at each of the intersection points. However, what is significant here is that, although each measurement M1 to M4 takes a time period of T/4 to make the measurement, data regarding each intersection point for a given receive electrode is obtained in each of the measurements M1 to M4. What this means is that data for each intersection point is actually obtained over the time period T (i.e., four times T/4 corresponding to the four measurements M1 to M4). Thus, effectively the number of samples for a particular intersection point is increased by four in this example. As mentioned, the signal to noise ratio is dependent upon the square root of the number of samples (or the duration over which the measurements are sampled), and thus the processing circuitry 106 of the described implementation is able to provide a roughly double signal to noise ratio for a given signal as compared to the conventional mutual capacitance techniques described in FIG. 3.

As mentioned in relation to FIG. 3, a balance must be struck between sensitivity and responsiveness to a touch. For a four by four grid using the mutual capacitance technique as described in FIG. 3, the total scan time (and thus responsiveness) is 4T, while the sample time for each intersection point is T/4. However, for a four by four grid of electrodes using the technique described in relation to FIG. 5, the total scan time is also 4T (assuming a total time of T is required for each receive electrode 102) but the sample time for each intersection point is increased to T because each measurement M1 to M4 contributes to T/4 worth of samples of the signal at the intersection point. Thus, assuming a constant sample rate, the sensitivity of the touch sensitive apparatus 1 can be improved in accordance with the techniques of FIG. 5 while maintaining the responsiveness. Alternatively, in accordance with the techniques of FIG. 5, the time for each measurement M1 to M4 can be shortened to T/16, thus meaning that each intersection point is sampled over an equivalent period of T/4 (which provides a similar signal to noise ratio, and thus sensitivity, as in the conventional example of FIG. 3 because the number of samples for each intersection point is similar in both methods). However, the total time required to scan four receive electrodes is four times the time required to scan an individual receive electrode, which in the present case is four times T/4 which is T. Thus, the responsiveness of the touch sensitive apparatus 1 can be improved while maintaining a similar sensitivity. It should be appreciated that both sensitivity and responsiveness may be improved by setting the value for each measurement M1 to M4 between T/4 and T/16.

Hence, by comparing the derived measurement of the mutual capacitance at each intersection point to a threshold value, it can be determined by the processing circuitry 106 at which intersection points on the touch sensitive element a touch 109 is present. For example, the processing circuitry 106 in the present implementation is configured to determine a change in mutual capacitance by calculating the difference between the measured value of the mutual capacitance at an intersection point and a baseline value of the mutual capacitance for the intersection point in the absence of a touch obtained in advance. That is, the processing circuitry may subtract the value of $E_{102\text{-}1}$ obtained in equation (11) (or an average thereof) from the value of $E_{102\text{-}1}$ obtained in the absence of a touch (or an average thereof) and compare the difference to a predefined threshold. If the difference is greater than the predefined threshold, then the processing circuitry 106 may output a signal indicating the presence of a touch on the touch sensitive element. The output signal may either be an indication that a touch is detected, or it may include the location (e.g., X-Y coordinates) of the detected touch on the touch sensitive element. In some instances, the signal may include multiple locations corresponding to multiple detected touches.

Figure 6:
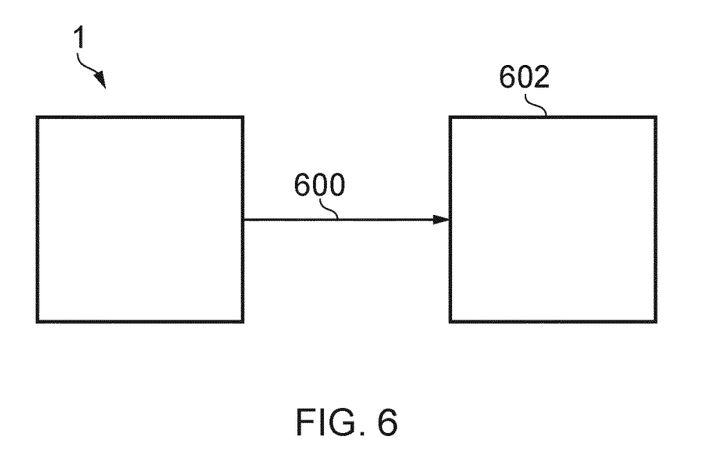
FIG. 6 schematically illustrates an example system which employs the touch sensitive apparatus of FIG. 1 in accordance with certain embodiments of the invention.

FIG. 6 is a highly schematic diagram showing the touch sensitive apparatus 1 coupled to an associated apparatus 602. The associated apparatus 602 generally comprises a computer processor which is capable of running a software application, and may also comprise a display element, such as an LCD screen or the like. In some implementations, the touch sensitive apparatus 1 is integrally formed with the associated apparatus 602, whereas in other implementations the touch sensitive apparatus 1 is able to be coupled to the associated apparatus 602 e.g., via electrical cabling. As described above, in some instances the substrate 103 and cover 108 of the touch sensitive apparatus 1 are transparent and a display element is placed behind the substrate 103 and cover 108, such as in a smartphone.

The touch sensitive apparatus 1 functions as an input mechanism for the associated apparatus 602. As mentioned, the processing circuitry 106 outputs a signal 600 indicating the presence of a touch on the touch-sensitive element to the processing circuitry of the associated apparatus (not shown). In some applications, signal 600 may simply indicate whether or not a genuine touch has been detected on the touch-sensitive element, whereas in other instances, the signal 600 may indicate one or more positions of the touch or touches on the touch-sensitive element, for example as X, Y coordinates (corresponding to the intersection points). The processing circuitry of the associated apparatus 602 may process the signal 600 in accordance with the application being run on the associated apparatus, e.g., by causing the associated apparatus to perform an action or change the image(s) that is displayed on the display unit.

Thus, the present disclosure relates to a touch-sensitive apparatus in which drive circuitry is configured to generate a first time-varying voltage signal and a second time-varying voltage signal that is the inverse the first time-varying voltage signal, and in which measurements of the mutual capacitances at intersection points between two electrodes can be measured simultaneously. Applying time varying voltage signals which are the inverse of one another allows for measurements of the mutual capacitance at intersection points of a plurality of transmit electrodes with respect to a given receive electrode simultaneously, and in such a way that an indication of the mutual capacitance at each intersection point can be extracted independently. More significantly, improvements in the sensitivity and/or responsiveness to touches on (or at) the surface of a touch sensitive element of the touch sensitive apparatus can be realised.

While the technique described above in relation to FIG. 5 has been described with respect to four drive electrodes 101, electrodes 1 to 4, the technique can be applied to any group of transmit electrodes comprising an even number of transmit electrodes, e.g., 2, 6, etc. Suitable algorithms for applying the drive signals and processing the received measurements can be adopted depending on the number of electrodes within the group of electrodes.

For example, taking the case of two transmit electrodes, electrodes 1 and 2, and a single receive electrode 102, the measurement circuitry 105 is configured to apply signal 1 to both electrode 1 and electrode 2 for a first time period, and signal 1 to electrode 1 and signal 2 to electrode 2 for a second time period. The mutual capacitance for each of the intersection points between electrodes 1 to 2 and receiver electrode 102 then take the following form:

$$E_{102\text{-}1} = M1 + M2 \tag{15}$$

$$E_{102\text{-}2} = M1 + M2 \tag{16}$$

where $E_{102\text{-}n}$ is the mutual capacitance for the intersection point between electrode 102 and electrode n of the group of drive electrodes 101. In this example, the measurements M1 and M2 can be represented as:

$$M1 = +B1\sin(\omega t) + +B2\sin(\omega t) \tag{17}$$

$$M2 = +B1\sin(\omega t) + -B2\sin(\omega t) \tag{18}$$

Accordingly, in the absence of a touch, and assuming B1=B2=B, the values for $E_{102\text{-}1}$ and $E_{102\text{-}2}$ are equal to $2B\sin(\omega t)$. In the event of a touch (again, for example at the intersection point between transmit electrode 1 and receiver electrode 102), then the values for the signals indicative of the mutual capacitances at the intersection points take the values as follows:

$$E_{102\text{-}1} = 2B1\sin(\omega t) \tag{19}$$

$$E_{102\text{-}2} = 2B\sin(\omega t) \tag{20}$$

where B2 is equal to B and B1 is different from B.

Similar principles as described above with respect to determining the presence of a touch on the touch sensitive element can be employed in the case of two transmit electrodes. Hence, generally, the principles of the present disclosure describe control circuitry configured to: perform a first measurement on the at least one receiver electrode during a first time period, wherein the control circuitry is configured to supply at least one of the first and second time-varying voltage signals to the first and second drive electrodes during the first time period; and perform a second measurement on the at least one receiver electrode during a second time period, wherein the control circuitry is configured to supply at least one of the first and second time-varying voltage signals to the first and second drive electrodes during the second time period; and determine a resultant signal corresponding to the mutual capacitance between the first electrode and the at least one receiver electrode based on both the first measurement and the second measurement. More specifically, and as described for the cases where two or four drive electrodes are considered, the control circuitry during at least one measurement period (i.e., corresponding to M1, M2, M3 or M4) supplies the first time-varying voltage signal to the first drive electrode or the second drive electrode and supplies the second time-varying voltage signal to the other of the first drive electrode or the second drive electrode. These measurements are then combined to provide a measure of the mutual capacitance at the intersection point between a given transmit electrode and a given receiver electrode, but in accordance with the principles of the present disclosure, the mutual capacitance for a given intersection point is measured over multiple measurement periods.

Figure 7:
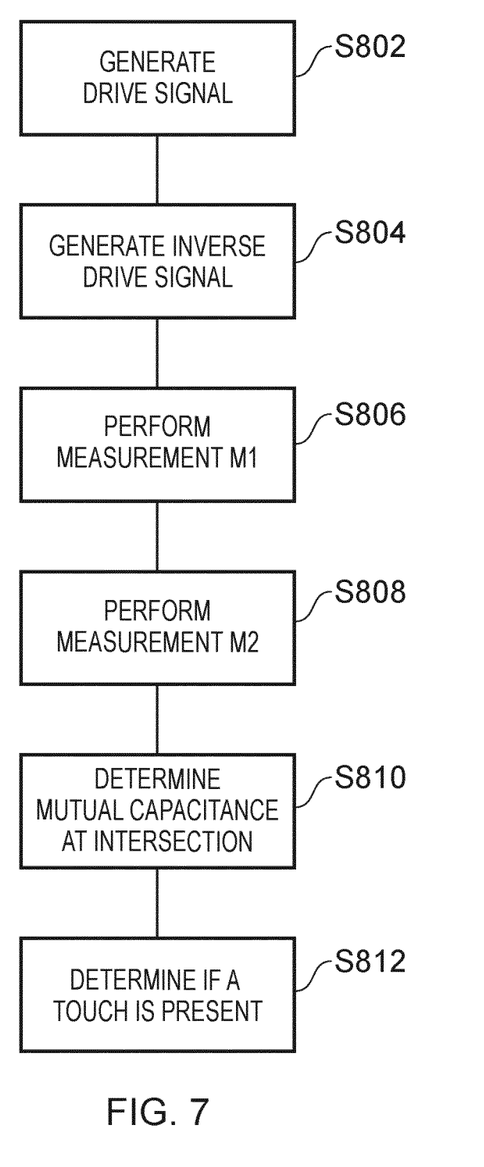
FIG. 7 shows a method for detecting a touch using a touch sensitive apparatus in accordance with certain embodiments of the invention.

FIG. 7 describes an exemplary method for determining the presence of a touch on a touch sensitive element of a touch sensitive apparatus 1 in accordance with the principles of the present disclosure.

The method begins at step S802 where drive circuitry 112 generates the drive signal (i.e., signal 1). At step S804, the drive circuitry 112 generates the inverse drive signal (i.e., signal 2). Step S804 may utilise the drive signal generated at step S802 as described previously.

At step S806, the method performs measurement M1 on a receive electrode that intersects at least two drive electrodes. This measurement M1 is performed for a first time period. As described previously, at step S806 the measurement circuitry 105 applies at least one of signal 1 and signal 2 to a first transmit electrode and a second transmit electrode. For example, and as described above, the measurement circuitry 105 applies signal 1 to both the first and second transmit electrodes. Signal 1 couples to the receive electrode 102 from both transmit electrodes, and measurement circuitry 105 performs measurement M1. The method proceeds then to step S808.

At step S808, the method performs measurement M2 on the same receive electrode. This measurement M2 is performed for a second time period, which in this implementation is of the same duration as the first time period. As described previously, at step S808 the measurement circuitry 105 applies at least one of signal 1 and signal 2 to a first transmit electrode and a second transmit electrode. For example, and as described above, the measurement circuitry 105 applies signal 1 to the first transmit electrode and signal 2 to the second transmit electrode. Signals 1 and 2 couple to the receive electrode 102 from the respective transmit electrodes, and measurement circuitry 105 performs measurement M2.

Although not shown, the method may perform further measurements depending upon the number of transmit electrodes included in the group of transmit electrodes. That is, for N transmit electrodes in the group, the measurement circuitry 105 performs MN measurements.

The method proceeds then to step S810 where the processing circuitry, using measurements MN, determines a value or signal indicative of the mutual capacitance at each of the N intersections with the receive electrode. As described above, the processing circuitry may use equations (11) to (14) or (19) and (20), or variations thereof, depending on the number of transmit electrodes in the group of electrodes.

At step S812, the method the proceeds to determine whether a touch is detected at any of the intersection points. As described previously, this may involve determining a change in the signal indicative of the mutual capacitance of the intersection point by comparing the signal obtained at step S810 with a value for the intersection point obtained in the absence of a touch. If the difference/change exceeds a predetermined amount, then the processing circuitry 106 determines that a touch is present at the intersection point.

Although FIG. 7 shows the method ending here, it should be appreciated that steps S806 to S812 may be repeated cyclically during operation of the touch sensitive apparatus 1. In addition, steps S806 to S810 may be performed individually for a number of groups of transmit electrodes (described in more detail below) prior to step S812 being performed. In some implementations, a measurement value may be obtained for each of the intersection points of an array of transmit and receive electrodes prior to step S812 being performed.

Although the above has described the case of two transmit electrodes and a single receive electrode, in some implementations this arrangement may not yield a satisfactory result, depending on the application at hand. As described, during the first measurement period (i.e., when the measurement circuitry 105 obtains measurement M1), signal 1 is applied to both electrode 1 and electrode 2. Thus, the measurement circuitry 105 in this instance receives a signal which is proportional to twice that of signal 1 (i.e., 2Bsin (ωt)). However, in the second measurement period (i.e., when the measurement circuitry 105 obtains measurement M2), signal 1 is applied to electrode 1 and signal 2 is applied to electrode 2. Thus, the measurement circuitry 105 in this instance receives a signal which is around zero (i.e., M2=−Bsin(ωt)++Bsin(ωt)). In this case, the receiver at measurement circuitry 105 receives a signal which varies from 0 to the maximum amplitude of 2B (note in the presence of a touch, the maximum amplitude is less than 2B). Contrast this with the four transmit electrode case described in FIG. 5, where the maximum amplitude for each measurement M1 to M4 is around 2B. In other words, the receivers in the four transmit electrode case experience more or less the same state for each measurement period M1 to M4. In the first case, where the receiver receives a signal which varies from 0 to 2B, the source of the noise varies considerably. As mentioned previously, the signal to noise ration of a signal varies according to the square root of the number of samples, hence the greater the number of samples, the lower the signal to noise ratio. However, this only holds for a constant, but random, noise source. In the two drive electrode implementation, the source of noise varies from 0 to 2B and is therefore not constant, and hence the signal to noise ratio does not follow the expected square root of the number of samples. It has been found experimentally that the signal to noise ratio is greater than the expected square root of the number of samples. Conversely, in the four drive electrode case, where the receive signal is approximately constant at 2B. Hence, in the four electrode case, this means that the potential of an improved signal to noise ratio is much more likely to be obtained.

It should be appreciated that most touch screens comprise a large number of transmit and receive electrodes defining hundreds of intersection points on a touch sensitive surface. While the present disclosure has primarily focused on applying drive signals to one group of four electrodes, the plurality of drive electrodes may be divided into a number of groups of four electrodes and the processing circuitry 106 may be configured to sequentially measure each of the groups of four in accordance with the described techniques in order to scan the entire electrode array.

Moreover, when dividing the plurality of drive electrodes into groups of four (or any other even number of drive electrodes), there may be some groups of transmit electrodes left over which do not comprise the same number of electrodes in the group, e.g., three electrodes. However, to compensate for this, two groups can be made to overlap. That is, for a first group, drive electrodes 1 to 4 are included as the four electrodes. Conversely, for a second group, drive electrodes 5 to 8 are included as the four electrodes. However, electrode 4 and electrode 5 may be the same electrode (which would be the case if, for example, there were seven drive electrodes). Thus the processing circuitry 106 is configured to perform measurements M1 to M4 on electrodes 1 to 4, and to subsequently perform measurements M1 to M4 on electrodes 5 to 8. In this instance, electrode 4 (or electrode 5) is measured twice. However, measuring electrodes twice in accordance with the descried technique outweighs measuring the three remaining transmit electrodes according to the conventional technique described in relation to FIG. 3. The plurality of electrodes may be divided into groups of an even number of transmit electrodes of any size, as described above.

Further, it should be appreciated that while the drive signal is described as a sinusoidal signal (either signal 1 or signal 2), the principles of the described technique are equally applicable to other signal waveforms for which an inverse waveform of signal 1 can be generated as signal 2, e.g., a square wave, whereby the inverse signal varies in opposition to the initial signal.

Thus there has been described a touch-sensitive apparatus, the apparatus comprising: a plurality of drive electrodes, comprising at least a first electrode and a second electrode; at least one receiver electrode; drive circuitry configured to generate a first time-varying voltage signal and a second time-varying voltage signal, wherein the first and second time-varying voltage signals are the inverse of one another; and control circuitry configured to: perform a first measurement on the at least one receiver electrode during a first time period, wherein the control circuitry is configured to supply at least one of the first and second time-varying voltage signals to the first and second drive electrodes during the first time period; and perform a second measurement on the at least one receiver electrode during a second time period, wherein the control circuitry is configured to supply at least one of the first and second time-varying voltage signals to the first and second drive electrodes during the second time period; and determine a resultant signal corresponding to the mutual capacitance between the first electrode and the at least one receiver electrode based on both the first measurement and the second measurement.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A touch-sensitive apparatus, the apparatus comprising:
   a plurality of drive electrodes, comprising at least a first electrode and a second electrode;
   at least one receiver electrode;

drive circuitry configured to generate a first time-varying voltage signal and a second time-varying voltage signal, wherein the first and second time-varying voltage signals are the inverse of one another; and control circuitry configured to:

perform a first measurement on the at least one receiver electrode during a first time period, wherein the control circuitry is configured to supply at least one of the first and second time-varying voltage signals to the first and second drive electrodes during the first time period;

perform a second measurement on the at least one receiver electrode during a second time period, wherein the control circuitry is configured to supply at least one of the first and second time-varying voltage signals to the first and second drive electrodes during the second time period; and determine a resultant signal corresponding to the mutual capacitance between the first electrode and the at least one receiver electrode based on both the first measurement and the second measurement, wherein the plurality of drive electrodes is divided into groups of drive electrodes consisting of N drive electrodes, and wherein, when the plurality of electrodes divided by N is not equal to an integer, the control circuitry is configured to include at least one drive electrode in two groups; and wherein in at least one of the first time period and the second time period, the control circuitry is configured to supply the first time-varying voltage signal, or the second time-varying voltage signal, to the at least one drive electrode included in the two groups, and to supply the other of the first time-varying voltage signal or the second time-varying voltage signal to at least one other drive electrode of at least one of the two groups.

2. The touch-sensitive apparatus of claim 1, wherein the control circuitry is configured to, for the first time period, apply the first time-varying voltage signal to the first electrode and the second time-varying voltage signal to the second electrode and perform the first measurement on the at least one receiver electrode, and for the second time period, apply the first time-varying voltage signal to the second electrode and the second time-varying voltage signal to the first electrode, and perform a second measurement on the at least one receiver electrode.

3. The touch-sensitive apparatus of claim 1, wherein the control circuitry is configured to determine the presence of a touch at an intersection between the first drive electrode and the at least one receiver electrode by comparing the difference between the resultant signal corresponding to the mutual capacitance between the first electrode and the at least one receiver electrode and a signal corresponding to the mutual capacitance between the first electrode and the at least one receiver electrode obtained in the absence o f a touch to a predetermined threshold.

4. The touch-sensitive apparatus of claim 1, wherein the control circuitry is configured to determine a resultant signal corresponding to the mutual capacitance between the second electrode and the at least one receiver electrode based on both the first measurement and the second measurement.

5. The touch-sensitive apparatus of claim 4, wherein, in at least one of the first period and the second period, the control circuitry is configured to supply the first time-varying voltage signal to the first drive electrode or the second drive electrode and to supply the second time-varying voltage signal to the other of the first drive electrode or the second drive electrode.

6. The touch-sensitive apparatus of claim 1, wherein the plurality of drive electrodes further includes third and fourth drive electrodes, and wherein the control circuitry is configured to:

perform a first measurement on the at least one receiver electrode during a first time period, wherein the control circuitry is configured to supply the first time-varying voltage signal to the first drive electrode and the second time-varying voltage signal to the second, third and fourth drive electrodes during the first time period;

perform a second measurement on the at least one receiver electrode during a second time period, wherein the control circuitry is configured to supply the first time-varying voltage signal to the second drive electrode and the second time-varying voltage signal to the first, third and fourth drive electrodes during the second time period;

perform a third measurement on the at least one receiver electrode during a third time period, wherein the control circuitry is configured to supply the first time-varying voltage signal to the third drive electrode and the second time-varying voltage signal to the first, second and fourth drive electrodes during the third time period;

perform a fourth measurement on the at least one receiver electrode during a fourth time period, wherein the control circuitry is configured to supply the first time-varying voltage signal to the fourth drive electrode and the second time-varying voltage signal to the first, second and third and drive electrodes during the second time period;

determine the resultant signal corresponding to the mutual capacitance between the first electrode and the at least one receiver electrode based on the first measurement, the second measurement, the third measurement and the fourth measurement;

determine a resultant signal corresponding to the mutual capacitance between the second electrode and the at least one receiver electrode based on the first measurement, the second measurement, the third measurement and the fourth measurement;

determine a resultant signal corresponding to the mutual capacitance between the third electrode and the at least one receiver electrode based on the first measurement, the second measurement, the third measurement and the fourth measurement; and determine a resultant signal corresponding to the mutual capacitance between the fourth electrode and the at least one receiver electrode based on the first measurement, the second measurement, the third measurement and the fourth measurement.

7. The touch-sensitive apparatus of claim 6, wherein the control circuitry is configured to:

determine the resultant signal corresponding to the mutual capacitance between the first electrode and the at least one receiver electrode by subtracting the second, third and fourth measurements from the first measurement;

determine the resultant signal corresponding to the mutual capacitance between the second electrode and the at least one receiver electrode by subtracting the first, third and fourth measurements from the second measurement;

determine the resultant signal corresponding to the mutual capacitance between the third electrode and the at least one receiver electrode by subtracting the first, second and fourth measurements from the third measurement; and determine the resultant signal corresponding to the mutual capacitance between the fourth electrode and the at least one receiver electrode by subtracting the first, second and third measurements from the fourth measurement.

8. The touch-sensitive apparatus of claim 1, wherein the plurality of drive electrodes is divided into groups of drive electrodes consisting of N drive electrodes, where N is an even number, and wherein the control circuitry is configured, for each group of drive electrodes, to perform N measurements, including the first and second measurements, over N time periods, wherein for each time period the control circuitry applies at least one of the first time-varying voltage signal and the second time-varying voltage signal to the drive electrodes.

9. The touch-sensitive apparatus of claim 8, wherein, for each N time period, the control circuitry is configured to apply a different combination of the first time-varying signal and the second time varying signal to the N drive electrodes.

10. The touch-sensitive apparatus of claim 8, wherein the control circuitry is configured to determine the resultant signal corresponding to the mutual capacitance at each intersection between the N drive electrodes and the at least one receive electrode.

11. A system comprising the touch-sensitive apparatus of claim 1, further comprising system processing circuitry communicatively coupled to the control circuitry of the touch-sensitive apparatus.

12. The system of claim 11, wherein the system processing circuitry is configured to cause the system to perform a first action in response to receiving a signal output from the control circuitry of the touch-sensitive apparatus indicating the presence of a touch on the touch-sensitive element.

13. A method for determining the presence of a touch on a touch-sensitive element of a touch-sensitive apparatus, the apparatus comprising a plurality of drive electrodes, comprising at least a first electrode and a second electrode, and at least one receiver electrode, wherein the method comprises:

generating a first time-varying voltage signal and a second time-varying voltage signal, wherein the first and second time-varying voltage signals are the inverse of one another;

performing a first measurement on the at least one receiver electrode during a first time period, wherein at least one of the first and second time-varying voltage signals is supplied to the first and second drive electrodes during the first time period;

performing a second measurement on the at least one receiver electrode during a second time period, wherein at least one of the first and second time-varying voltage signals is supplied to the first and second drive electrodes during the second time period; and determining a resultant signal corresponding to the mutual capacitance between the first electrode and the at least one receiver electrode based on both the first measurement and the second measurement, wherein the plurality of drive electrodes is divided into groups of drive electrodes consisting of N drive electrodes, and wherein, when the plurality of electrodes divided by N is not equal to an integer, at least one drive electrode is included in two groups; and wherein in at least one of the first time period and the second time period, the control circuitry is configured to supply the first time-varying voltage signal, or the second time-varying voltage signal, to the at least one drive electrode included in the two groups, and to supply the other of the first time-varying voltage signal or the second time-varying voltage signal to at least one other drive electrode of at least one of the two groups.

14. The method of claim 13, wherein, in at least one of the first period and the second period, the first time-varying voltage signal is supplied to the first drive electrode or the second drive electrode and the second time-varying voltage signal is supplied to the other of the first drive electrode or the second drive electrode and the second time-varying voltage signal is supplied to the other of the first drive electrode or the second drive electrode.

* * * * *